United States Patent
Liu (10) Patent No.: US 9,202,441 B2
(45) Date of Patent: Dec. 1, 2015

(54) ELECTRONIC APPARATUS SYSTEM FOR DYNAMICALLY ADJUSTING DISPLAY MODE AND DRIVE METHOD OF DISPLAY PANEL

(71) Applicant: Hung-Ta Liu, Zhubei (TW)

(72) Inventor: Hung-Ta Liu, Zhubei (TW)

( * ) Notice: Subject to any disclaimer, the term of this patent is extended or adjusted under 35 U.S.C. 154(b) by 0 days.

(21) Appl. No.: 14/546,479

(22) Filed: Nov. 18, 2014

(65) Prior Publication Data

US 2015/0070345 A1    Mar. 12, 2015

Related U.S. Application Data (60) Division of application No. 13/474,503, filed on May 17, 2012, now Pat. No. 8,912,994, which is a continuation-in-part of application No. 13/338,250, filed on Dec. 28, 2011, now Pat. No. 8,917,228.

(30) Foreign Application Priority Data

Dec. 31, 2010   (TW) ............................... 99147378 A
May 23, 2011   (TW) ............................. 100117992 A (51) Int. Cl.
*G09G 3/36* (2006.01)
*G09G 5/18* (2006.01)

(52) U.S. Cl.
CPC .. *G09G 5/18* (2013.01); *G09G 3/36* (2013.01); *G09G 3/3611* (2013.01); *G09G 3/3648* (2013.01); *G09G 2320/10* (2013.01); *G09G 2330/021* (2013.01); *G09G 2340/0435* (2013.01); *G09G 2370/04* (2013.01)

(58) Field of Classification Search
CPC .............. G09G 2340/0435; G09G 2300/0439; G09G 2300/08
USPC ...................................................... 345/99, 100
See application file for complete search history.

(56) References Cited

U.S. PATENT DOCUMENTS

| 4,028,692 A | 6/1977 | Ngo ................................ 345/87 |
| 6,897,845 B2 | 5/2005 | Ozawa ............................ 345/94 |

(Continued)

FOREIGN PATENT DOCUMENTS

| CN | 1440514 | 9/2003 | .............. G02F 1/133 |
| CN | 1173324 | 10/2004 | .............. G02F 1/333 |

(Continued)

OTHER PUBLICATIONS

Chinese Office Action (no translation) issued in related application No. 201110461161.7, dated Mar. 10, 2014 (10 pgs).

(Continued)

*Primary Examiner* — Roy Rabindranath
(74) *Attorney, Agent, or Firm* — Hayes Soloway P.C.

(57) ABSTRACT

An electronic apparatus system is provided. The electronic apparatus system includes a register, a display mode computation unit, a display device and a control circuit. The register stores image information having a data input refresh frequency. The display mode computation unit generates a display mode control signal by computation based on an image characteristic categorization of the image information. The display device includes a display panel having a plurality of pixel units. The control circuit controls a display mode and a drive mode of the display panel according to the display mode control signal to further adjust a display refresh frequency of the display panel.

7 Claims, 7 Drawing Sheets

(56) References Cited

U.S. PATENT DOCUMENTS

| | | | |
|---|---|---|---|
| 6,952,244 B2 | 10/2005 | Cairns et al. | 349/43 |
| 7,580,032 B2 | 8/2009 | Jung et al. | 345/204 |
| 7,764,258 B2 | 7/2010 | Kitamura et al. | 345/96 |
| 7,804,476 B2 * | 9/2010 | Hector et al. | 345/101 |
| 7,889,167 B2 | 2/2011 | Kim | 345/96 |
| 7,898,535 B2 * | 3/2011 | Juenger | 345/204 |
| 7,903,107 B2 | 3/2011 | Ostlund | 345/211 |
| 8,031,154 B2 | 10/2011 | Mamba et al. | 345/96 |
| 8,164,556 B2 | 4/2012 | Song et al. | 345/95 |
| 8,233,014 B2 | 7/2012 | Chiou et al. | 345/690 |
| 8,421,809 B2 | 4/2013 | Sumi | 345/545 |
| 8,520,036 B2 | 8/2013 | Miyata et al. | 345/690 |
| 8,570,362 B2 | 10/2013 | Park et al. | 348/51 |
| 8,593,382 B2 | 11/2013 | Kimura | 345/87 |
| 8,912,994 B2 * | 12/2014 | Liu | 345/99 |
| 2002/0084969 A1 | 7/2002 | Ozawa | 345/96 |
| 2002/0154253 A1 | 10/2002 | Cairns et al. | 345/43 |
| 2003/0122497 A1 | 7/2003 | Ko et al. | 315/169.3 |
| 2005/0012876 A1 | 1/2005 | Yakovenko et al. | 349/110 |
| 2005/0140632 A1 | 6/2005 | Tsuda et al. | 345/92 |
| 2006/0017678 A1 | 1/2006 | Shiomi | 345/89 |
| 2006/0066512 A1 | 3/2006 | Afentakis et al. | 345/55 |
| 2006/0093803 A1 | 5/2006 | Hwang et al. | 428/220 |
| 2006/0119559 A1 | 6/2006 | Jung et al. | 345/96 |
| 2007/0040823 A1 | 2/2007 | Hiroki et al. | 345/209 |
| 2007/0096100 A1 | 5/2007 | Lee et al. | 257/59 |
| 2007/0097107 A1 * | 5/2007 | Furukoshi | 345/204 |
| 2008/0030615 A1 | 2/2008 | Vasquez et al. | 348/446 |
| 2008/0055318 A1 | 3/2008 | Glen | 345/501 |
| 2008/0100598 A1 | 5/2008 | Juenger | 345/204 |
| 2008/0143908 A1 | 6/2008 | Bae et al. | 349/43 |
| 2008/0278431 A1 * | 11/2008 | Feng | 345/99 |
| 2009/0073103 A1 | 3/2009 | Tajiri | 345/98 |
| 2009/0174830 A1 | 7/2009 | Wang et al. | |
| 2010/0214328 A1 | 8/2010 | Hara | 345/690 |
| 2010/0315322 A1 * | 12/2010 | Cheng et al. | 345/99 |

FOREIGN PATENT DOCUMENTS

| | | | |
|---|---|---|---|
| CN | 1178197 | 12/2004 | G02F 1/1362 |
| CN | 1790470 | 6/2006 | G02F 1/133 |
| CN | 101154368 | 4/2008 | G02F 1/133 |
| CN | 101178881 | 5/2008 | G02F 1/133 |
| CN | 101188091 | 5/2008 | G02F 1/133 |
| CN | 101211029 | 7/2008 | G02F 1/133 |
| CN | 101231808 | 7/2008 | G09G 3/20 |
| CN | 101763841 | 6/2010 | G09G 5/00 |
| CN | 101819754 | 9/2010 | G09G 3/20 |
| CN | 101901575 | 12/2010 | G09G 3/20 |
| JP | 2005345685 | 12/2005 | G09G 3/36 |
| JP | 2009075392 | 4/2009 | G09G 3/36 |
| TW | 201110102 | 3/2001 | G09G 3/34 |
| TW | 502448 | 9/2002 | G02F 1/136 |
| TW | I233072 | 5/2005 | G02F 1/133 |
| TW | 200715253 | 4/2007 | G09G 3/20 |
| TW | 200721507 | 6/2007 | H01L 29/786 |
| TW | I302282 | 10/2008 | G02F 1/133 |
| TW | 200842786 | 11/2008 | G09G 3/18 |
| TW | I317119 | 11/2009 | G02F 1/133 |
| TW | 201030721 | 8/2010 | G09G 3/36 |

OTHER PUBLICATIONS

Chinese Office Action (no translation) issued in related application No. 201210159629.1, dated Apr. 1, 2014 (8 pgs).

Chinese Office Action (no translation) issued in related application No. 201210319984.0, dated Apr. 23, 2014 (8 pgs).

Taiwanese Office Action issued in related application No. 10221332700, dated Sep. 30, 2013 (11 pgs).

Taiwanese Office Action issued in related application No. 10221580990, dated Nov. 20, 2013 (9 pgs).

Chinese Office Action issued in corresponding Chinese Patent Appln. No. 2012 0319984.0 dated Dec. 15, 2014 (9 pgs).

* cited by examiner

ELECTRONIC APPARATUS SYSTEM FOR DYNAMICALLY ADJUSTING DISPLAY MODE AND DRIVE METHOD OF DISPLAY PANEL

RELATED APPLICATIONS

This application is a divisional application of U.S. application Ser. No. 13/474,503, filed on May 17, 2012, which claims priority to Taiwanese Application Serial Number 100117992 filed on May 23, 2011, currently allowed, in which the U.S. application Ser. No. 13/474,503 is a continuation-in-part of U.S. application Ser. No. 13/338,250, filed on Dec. 28, 2011, which claims priority to Taiwanese Application Serial Number 099147378, filed on Dec. 31, 2010, currently allowed.

BACKGROUND

1. Technical Field

The present disclosure relates to an electronic technology. More particularly, the present disclosure relates to an electronic apparatus system.

2. Description of Related Art

In recent years, a liquid crystal display (LCD) apparatus has been applied in many areas, including a notebook personal computer, a monitor, a vehicular navigation device, a functional calculator, various sizes of TV sets, a mobile phone and an electronic message board. Particularly, the current thin and light or portable electronic products have become a new trend in the market. The LCD apparatus has a smaller volume and thickness than the prior CRT (cathode-ray tube) display apparatus, so the LCD apparatus has been widely applied.

In the development of the current electronic display technology, the power consumption of the display apparatus is emphasized, so the LCD apparatus with low power consumption better meets the requirements of a user for energy saving and environment protection. Particularly, in a portable display apparatus (such as a cellular phone, a smart phone, a PDA (personal digital assistant), an e-book and a tablet computer), the power consumption of the LCD module directly influences the endurance of the entire apparatus. Particularly, in the current large-size, thin and light display apparatus, the LCD module with the low power consumption and high efficiency is urgently demanded.

The current LCD apparatus generally has a certain refresh rate or frame rate. Generally, the LCD apparatus adopts the rate of 60-70 Hz. That is, the frame refreshes 60-70 times per second.

In other words, even if the display frame of the LCD apparatus has no change or few changes, the display driving circuit may still periodically refresh a display signal of each pixel of the display module at the rate of 60 times per second. Thus, unnecessary energy consumption is generated.

For a current general TFT-LCD (thin film transistor liquid crystal display) apparatus on the market, the power consumption is mainly caused by the LCD panel, the driving circuit and the backlight module. Taking the 10.1-inch TFT-LCD apparatus with a resolution of 1280×800 as an example, the power consumption of the LCD panel and the driving circuit is approximately between 1000 mW and 2000 mW. On the other hand, the power consumption of the backlight module is approximately between 2000 mW and 3000 mW. Further, the power consumption of the middle size or the small size devices such as a cell phone, a tablet PC or an e-book is approximately between 200 mW and 500 mW. Though the power consumption of the backlight module can be largely avoided, it is still hard to decrease the power consumption of the system end, the display panel and the drive circuit.

Although a polarity inversion driving manner, e.g. a row inversion driving manner or a frame inversion driving manner, has been proposed in this industry directed for the driving circuit, and an area scanning backlight manner has been proposed directed for the backlight module, the above manners have limited effects. Therefore, those in the industry are endeavoring to find an LCD apparatus having a stable display effect and low energy consumption and a display driving method thereof.

In a display frame cycle between two display signal refreshes, the potential levels of the storage capacitance in the LCD apparatus may gradually decrease over time, resulting in the transmittance variance of the LCD panel. For example, in a normally white mode, the transmittance increases over time, and in a normally black mode, the transmittance decreases over time, thus probably resulting in the inconsistent or unstable display brightness/luminance in a display frame cycle and further causing the blink and screen flicker phenomena. Particularly, at the low refresh rate, the potential-levels attenuation degree of the storage capacitance is more apparent, and consequently, the problem of screen flicker is severe.

SUMMARY

An aspect of the present disclosure is to provide an electronic apparatus system. The electronic apparatus system at least comprises a register, a display mode computation unit, a display device and a control circuit. The register stores image information having a data input refresh frequency. The display mode computation unit generates a display mode control signal by computation based on an image characteristic categorization of the image information. The display device comprises a display panel having a plurality of pixel units. The control circuit controls a display mode and a drive mode of the display panel according to the display mode control signal to further adjust a display refresh frequency of the display panel according to a frequency adjusting unit.

Another aspect of the present disclosure is to provide an electronic apparatus system. The electronic apparatus system at least comprises a register, a display device and a control circuit. The register stores image information having a data input refresh frequency. The display device comprises a display panel having a plurality of pixel units and a plurality of storage capacitor units. The control circuit controls a display mode and a drive mode of the display panel and further adjust a drive method and a control circuit compensation structure of the display panel dynamically.

Yet another aspect of the present disclosure is to provide an electronic apparatus system. The electronic apparatus system at least comprises a register, a display device and a control circuit. The register stores image information having a data input refresh frequency. The display device comprises a display panel having a plurality of pixel units and a plurality of storage capacitor units. The control circuit controls a display mode and a drive mode of the display panel and further adjust a drive compensation method and parameters of the display panel dynamically.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1A:
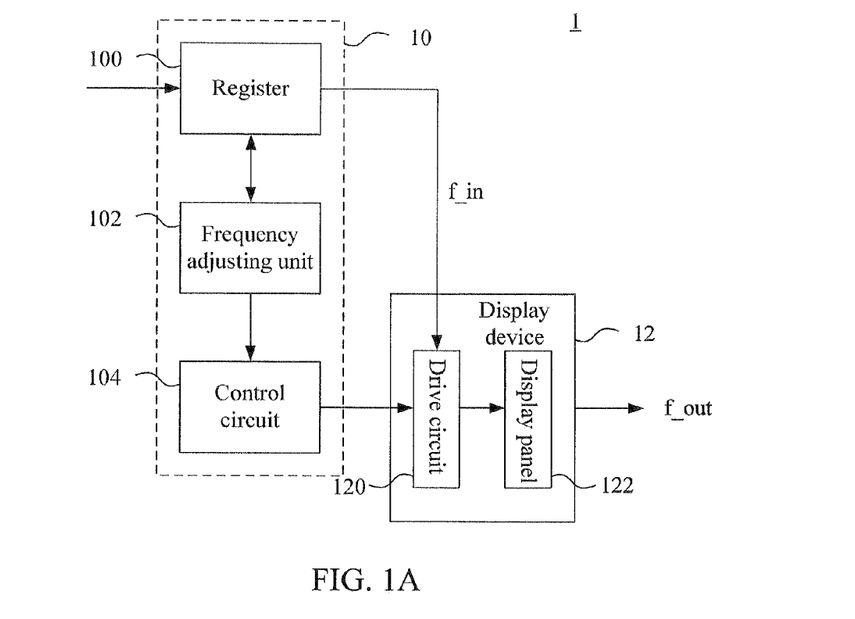
FIG. 1A is a block diagram of an electronic apparatus system in an embodiment of the present disclosure.

FIG. 1A is a block diagram of an electronic apparatus system 1 in an embodiment of the present disclosure. The electronic apparatus system 1 comprises a host 10 and a display device 12. The electronic apparatus system 1 can be a composite personal computer system, a handheld electronic device, a digital camera, a digital frame, a MP3 or MP4 player. The host 10 comprises a register 100, a frequency adjusting unit 102 and a control circuit 104. The display device 12 comprises a drive circuit 120 and a display panel 122.

In the present embodiment, the register 100 can a memory in the host 10 to receive image information and store the image information having a data input refresh frequency f_in. The host 10 may further comprise a central processing unit (CPU) or a timing controller to transmit the image information to the register 100. The data input refresh frequency f_in comprises two or more than two values. In an embodiment, the data input refresh frequency f_in can be a base frequency and frequency values that are N times of the base frequency, wherein N is a positive integer. For example, a common display panel can receive the image information having a data input refresh frequency of 60 Hz or a data input refresh frequency within a range of 55 Hz to 85 Hz and display the image information. In the present embodiment, the display device 12 can receive the image information having the data input refresh frequency f_in of base frequency 60 Hz and frequency values that are N times of the base frequency such as 120 Hz or 240 Hz. It is noted that the data input refresh frequency can be within a range of +10% and −10% of the value under the multiple frequency mode. In an embodiment, the data input refresh frequency f_in can be larger than 100 Hz. In an embodiment, the data input refresh frequency f_in can be represented by the following equation: f_in=60*N, in which N is a positive integer. For example, the data input refresh frequency f_in can be 120 Hz, 180 Hz, 240 Hz or 480 Hz (comprising the range of +10% and −10% of these values). The multiple frequency mode can be used in the applications such as 3D TV, 3D games or rapid liquid crystal display to receive the image information having higher frequency and display it on the display panel 122.

The register 100 is coupled to the drive circuit 120 and the frequency adjusting unit 102. The drive circuit 120 displays the image information on the display panel 122. The control circuit 104 is coupled to the drive circuit 120 and the frequency adjusting unit 102 as well. In the present embodiment, the control circuit 104 is a micro controller of the host 10.

It is noted that the drive circuit 120 of the present embodiment does not used a fixed display refresh frequency f_out. The drive circuit 120 of the present embodiment adapts a display refresh frequency f_out that can be dynamically adjusted according to the data input refresh frequency f_in and according to the frequency adjusting unit 102 based on an image characteristic categorization of the image information such that the drive circuit 120 can drive the display panel 122 with a power-saving strategy. Hence, the display refresh frequency f_out comprises two or more than two values.

The frequency adjusting unit 102 generates a display mode control signal by computation based on the data input refresh frequency f_in and the image characteristic categorization of the image information. The control circuit 104 further controls a display mode and a drive mode of the display panel 122 according to the display mode control signal to further adjust the display refresh frequency f_out of the display panel 122 according to the frequency adjusting unit 102.

The image characteristic categorization at least comprises a motion image (e.g. the images of movies, animations or sports games), a slow motion image (e.g. the images of ecological photography or peel-away ads), a still image (e.g. the images of pictures, photos or print ads) or a text mode. The frequency adjusting unit 102 can generate the display mode control signal according to the corresponding image characteristic categorization. For example, the frequency adjusting unit 102 can maintain the display refresh frequency f_out at a high level (e.g. 60 Hz) or switch to a higher level under the multiple frequency mode to satisfy the needs of applications such as 3D TV, 3D games or rapid liquid crystal display (e.g. 120 Hz, 180 Hz, 240 Hz or 480 Hz and the values within the range of +10% and −10% of these values). A lower display refresh frequency f_out such as 20 Hz or 15 Hz can be used when the slow motion image is presented. When the image information contains still images, the frequency adjusting unit 102 can further adjust the display refresh frequency f_out to a very low level such as 5 Hz, 3 Hz or 0.3 Hz. However, the above descriptions are merely an example. If power-saving is the main strategy, it is possible to switch the display refresh frequency f_out to a very low level even the motion images are presented. In an embodiment, the low frequency mode is used when the slow motion images or the still images are presented or when the power-saving is the main strategy. The display refresh frequency f_out in the low frequency mode can be within a range of +10% and −10% of the values that is 1/P times of the data input refresh frequency under a low frequency mode, wherein P is a positive integer.

As described above, the frequency adjusting unit 102 can provide two groups (high/low), three groups (high/medium/low) or more than three groups of display refresh frequencies. In an embodiment, the frequency adjusting unit 102 can provide a display refresh frequency that is lower than 20 Hz. In another embodiment, the frequency adjusting unit 102 can provide a display refresh frequency that is lower than 5 Hz. In yet another embodiment, the frequency adjusting unit 102 can provide a display refresh frequency that is lower than 1 Hz.

Besides, the image information further has image characteristic sub-categorization that comprise a full-color mode, a picture mode, a text mode and a single-color mode. The frequency adjusting unit 102 can take the image characteristic categorization and the image characteristic sub-categorization into consideration to generate an appropriate display mode control signal.

For example, the motion image, the slow motion image and the still image can be further categorized into the full-color mode, the picture mode, the text mode and the single-color mode. In other words, the motion image, the slow motion image and the still image can be further categorized into, but not limited to, at least four types of images such as a full-color image, a full-color text, a single-color image and a single-color text.

It is noted that the frequency adjust unit 102 can also directly provide an image having a display refresh frequency that is lower than or equal to 30 Hz according to the image information described above without any adjustment.

Figure 1B:
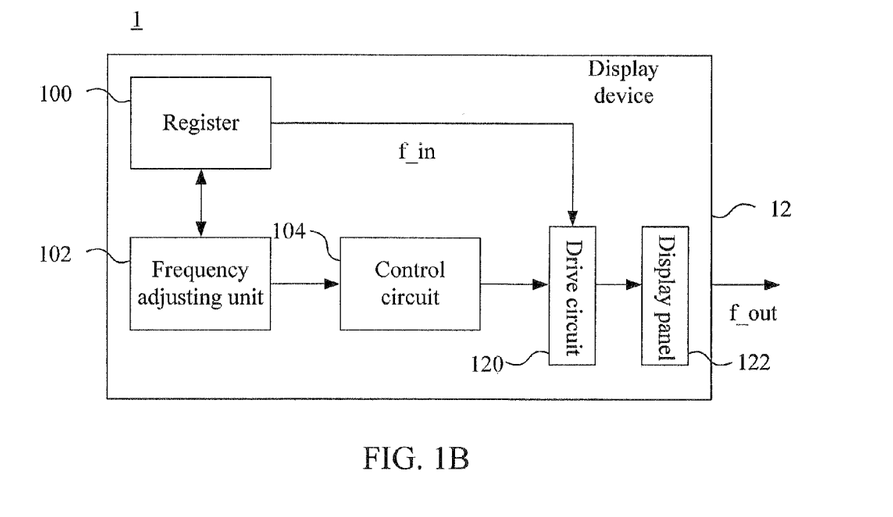
FIG. 1B is a block diagram of an electronic apparatus system in the second embodiment of the present disclosure.

FIG. 1B is a block diagram of an electronic apparatus system 1 in the second embodiment of the present disclosure. In the present embodiment, the register 100, the frequency adjusting unit 102, the control circuit 104, the drive circuit 120 and the display panel 122 are disposed in the display device 12. Therefore, the dynamic adjustment mechanism described above can be implemented in the display device. The dynamic adjustment mechanism in the present embodiment can be performed actively, which is different from the architecture shown in FIG. 1A. In the electronic apparatus system 1 depicted in FIG. 1A, the dynamic adjustment mechanism is performed on the drive circuit 120 by the control circuit 104 passively according to the display mode control signal transmitted by the frequency adjusting unit 102.

The elements in the display device 100 are not limited by the elements shown in FIG. 1A and FIG. 1B. It is noted that in different embodiments, the display panel of the display device 100 can be a liquid display panel, an electrophoretic display panel, an electrode wetting display panel or an OLED display panel. Take the liquid crystal display panel for example, the display device 100 may further comprises a timing control circuit or a signal-receiving interface.

Figure 2:
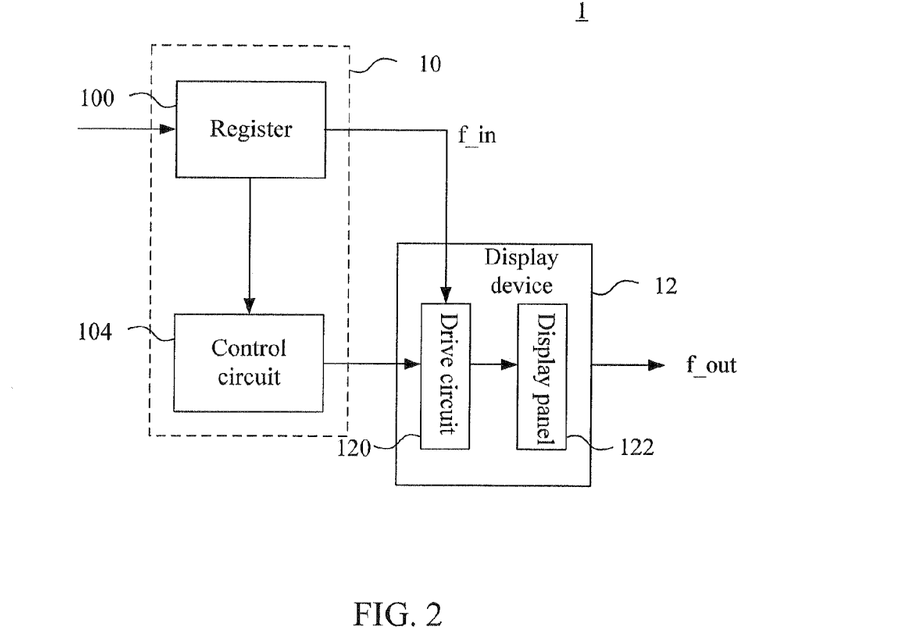
FIG. 2 is a block diagram of an electronic apparatus system of the third embodiment of the present disclosure.

FIG. 2 is a block diagram of an electronic apparatus system 1 of the third embodiment of the present disclosure. In the present embodiment, the frequency adjusting unit 102 is not presented in the electronic apparatus system 1. Consequently, after the register 100 receives the image information, the control circuit 104 can control the drive circuit 120 to drive the display panel 122 to directly output a display frame having a display refresh frequency that is lower than or equal to 30 Hz.

Figure 3A:
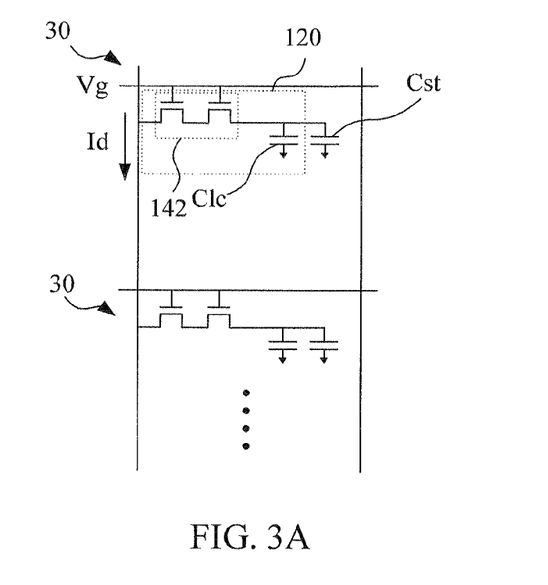
FIG. 3A is a top view of pixel units of the display device in an embodiment of the present disclosure.

FIG. 3A is a top view of pixel units 30 of the display device 12 in an embodiment of the present disclosure. Take the liquid crystal display as an example, the display panel 122 comprises a plurality of pixel units 30 (e.g. 1024*768 pixel units). Each of the pixel units 30 comprises a liquid crystal capacitor Clc and the drive circuit 120 comprises a plurality of storage capacitor units Cst each corresponding to the liquid crystal capacitor Clc of one pixel unit 30. In general, the voltage level of the liquid crystal capacitor Clc represents the content of the display signal. The storage capacitor units Cst is connected to the liquid crystal capacitor Clc in parallel, in which the storage capacitor units Cst is used to maintain the voltage level of the display signal. When the display refresh frequency is decreased, the refreshing period of the capacitor turns longer. The liquid crystal capacitor Clc may not be able to maintain the voltage for such a long time. However, the capacitance of the storage capacitor units Cst in the present disclosure is far larger than the capacitance of the liquid crystal capacitor Clc such that the voltage level of the liquid crystal capacitor Clc can be maintained. In an embodiment, the capacitance of the storage capacitor units Cst is ten times or even fifty times of the capacitance of the liquid crystal capacitor Clc. Hence, the ability of voltage level maintenance of the display signal can be increased.

Figure 4:
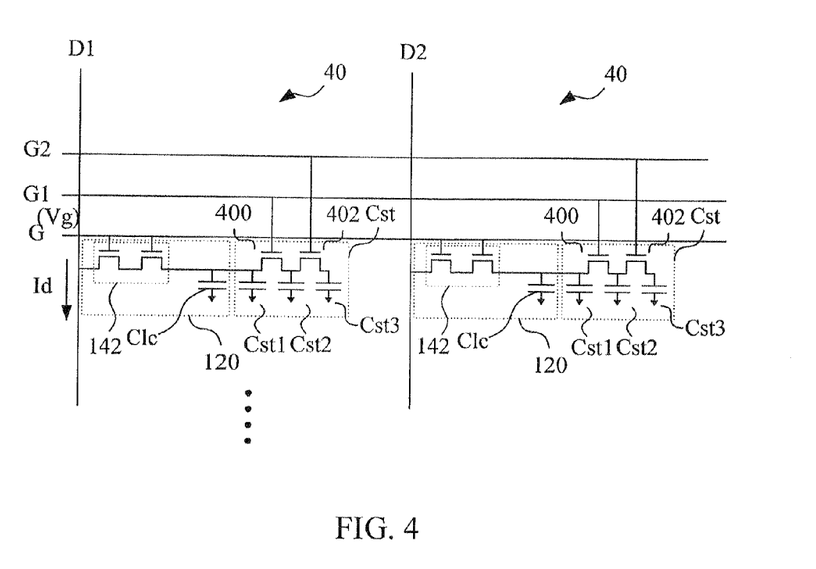
FIG. 4 is a top view of the pixel units in an embodiment of the present disclosure.

FIG. 4 is a top view of the pixel units 40 in an embodiment of the present disclosure. In the present embodiment, each of the storage capacitor units Cst of the pixel units 40 further comprises a plurality of storage capacitor blocks Cst1, Cst2 and Cst3. The connecting form of the storage capacitor blocks Cst1, Cst2 and Cst3 can be adjusted according to the display mode control signal to modify the effective capacitive value of the storage capacitor units Cst. The connecting form of the storage capacitor blocks Cst1, Cst2 and Cst3 is adjusted by disposing the switches 400, 402 and the control signal lines G1 and G2 such that the effective capacitive value of the storage capacitor units Cst can be modified according to the change of the driving mode or the display mode (e.g. the variation of the display refresh frequency described above) or according to a low display refresh frequency. The controlling mechanism of the switches 400 and 402 can be accomplished according to each of the scan lines such that the capacitance of each of the storage capacitor units Cst of the pixel units 40 can be modified separately. In other embodiment, the capacitance of the storage capacitor units Cst of the pixel units 40 can be modified together.

For example, if the display refresh frequency f_out of the drive circuit 120 is maintained at a hight level according to the display mode control signal, only a part of the storage capacitor units Cst (such as the storage capacitor blocks Cst1) is needed be used to maintain the voltage level of the liquid crystal capacitor Clc. However, when the display refresh frequency f_out is greatly decreased, all parts of the storage capacitor units Cst (the storage capacitor blocks Cst1, Cst2 and Cst3) can be used to increase the capacitance of the storage capacitor units Cst to maintain the voltage level of the liquid crystal capacitor Clc having a longer refreshing period.

In other embodiments, the capacitance of the storage capacitor units Cst can be modified according to the type of the light source (e.g. a penetrating type or a reflective type light source) of the display device 12 or the display mode (e.g. a bi-stable mode, a multi-stable mode or a different liquid phase mode) of the display device 12.

It is also noted that the storage capacitor units Cst described above can be applied to different kinds of display device such as a TFT liquid display panel, an electrophoretic display panel, an electrode wetting display panel, an oxide TFT liquid display panel or a liquid crystal on Si-wafer display panel.

The drive circuit 120 can make use of different drive method and different amount of drive current Id to display the image information on the display panel 122 according to different display modes, different display refresh frequencies, different capacitances of the storage capacitor units Cst and different drive modes.

In order to display the image information on the display panel 122, the drive circuit 120 turns on the gate of the pixel units 122 in each row subsequently by using the gate control signal Vg according to the display refresh frequency and charge the pixel units 122 with a drive current Id, in which the drive current Id can be adjusted by changing a number of current supply pins and/or a current-branching circuit of a drive circuit of the display device.

Figure 5:
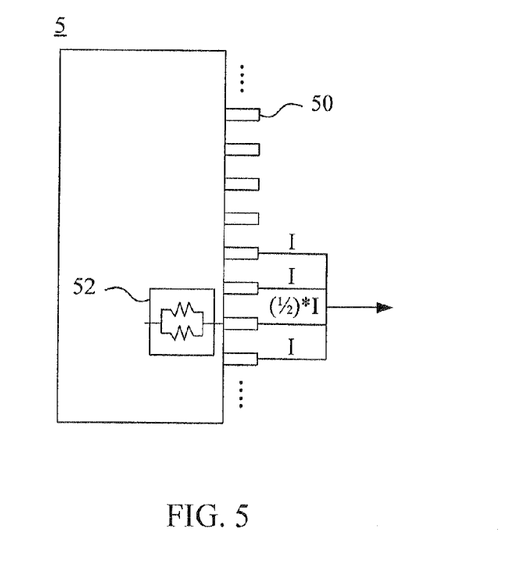
FIG. 5 is a block diagram of a current supply chip in an embodiment of the present disclosure.

FIG. 5 is a block diagram of a current supply chip 5 in an embodiment of the present disclosure. The current supply chip 5 can be disposed in the drive circuit such as a source driver or a gate driver or can be disposed in the timing controller. The current supply chip 5 comprises a plurality of current supply pins 50. One current supply pin 50 can provide a drive current having a current value of I. The amount of current provided by each of the current supply pins 50 has an upper limit. Therefore, the drive current can be provided by two or more than two current supply pins 50 to provide the drive current having the current value of 2I, 3I, 4I, etc. The drive current can be transmitted to the scan lines or the data lines and can be further provided to the display panel 122. Furthermore, a current-branching circuit 52 (e.g. a combination of resistors) can be disposed to be connected to the current supply pins 50 such that the drive current Id that is not an integer multiple of I (e.g. (3/2)*I or (5/4)*I) can be provided. For example, each of the three of the current supply pins 50 of the current supply chip 5 depicted in FIG. 5 provides a part of the drive current having a current value of I, in which one of the current supply pins 50 other than the three current supply pins 50 provides another part of the drive current having a current value of (1/2)*I. Consequently, the four current supply pins 50 can provide a drive current having a total current value of (7/2)*I.

Figure 6:
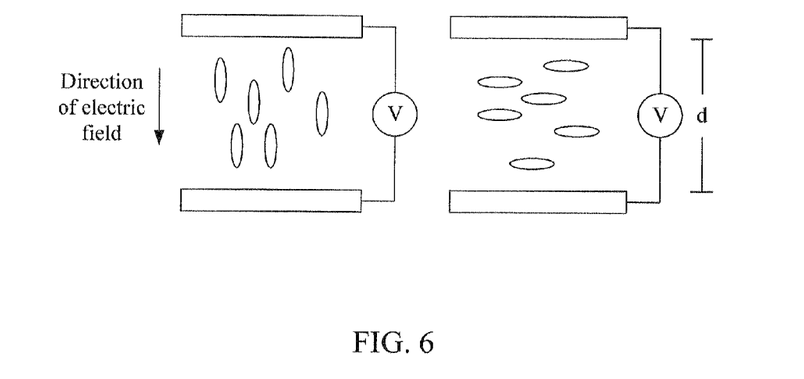
FIG. 6 is a diagram depicting the molecules of the liquid crystal.

FIG. 6 is a diagram depicting the molecules of the liquid crystal, wherein the left side of the diagram depicts the molecules when their long axes are parallel to the electric field and the right side of the diagram depicts the molecules when their long axes are vertical to the electric field. When the long axes of the molecules of the liquid crystal are parallel to the electric field, the dielectric coefficient of the molecules is $\in //$. When the long axes of the molecules of the liquid crystal are vertical to the electric field, the dielectric coefficient of the molecules is $\in \perp$. The relation of the effective capacitance of the molecules of the liquid crystal and the electric field can be expressed as the function shown below:

$$C = \in r \in 0 \cdot (A/d)$$

Consequently, if the capacitance C// is the capacitance of the liquid crystal capacitor Clc when the molecules of the liquid crystal are parallel to the electric field, it can be expressed as the functions shown below:

$$C// = \in // \in 0 \cdot (A/d)$$

On the other hand, if the capacitance C⊥ is the capacitance of the liquid crystal capacitor Clc when the molecules of the liquid crystal are vertical to the electric field, it can be expressed as the functions shown below:

$$C_{\perp} = \in \perp \in 0 \cdot (A/d)$$

The capacitances C// and C⊥ and the dielectric coefficients $\in //$ and $\in \perp$ are the functions of the frequency:

$$C// = C//(f); C\perp = C\perp(f)$$

$$\in // = \in //(f); \in \perp = \in \perp(f)$$

Figure 7:
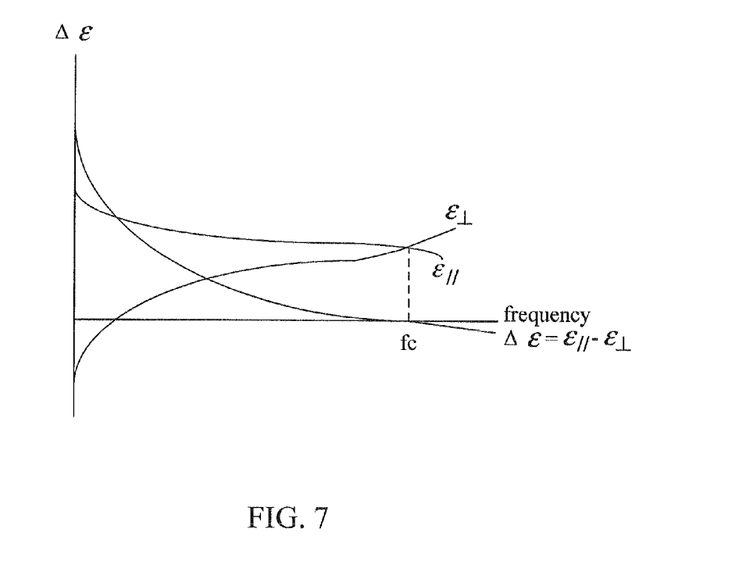
FIG. 7 is a graph depicting the curves of the dielectric coefficients $\in//$, $\in\perp$, the difference $\Delta\in$ related to the frequency.

FIG. 7 is a graph depicting the curves of the dielectric coefficients $\in //$, $\in \perp$, the difference $\Delta \in$ (i.e. the dielectric anisotropy of the liquid crystal) related to the frequency. Take the positive type liquid crystal ($\Delta \in > 0$) for example, the dielectric anisotropy of the liquid crystal is positive when the frequency is low and the dielectric anisotropy of the liquid crystal becomes negative when the frequency is high. The frequency that the dielectric anisotropy of the liquid crystal transits from positive to negative is called the cross-over frequency fc, in which the cross-over frequency fc is related to the structure of the molecule of the liquid crystal and the characteristic of the dipole orientation. The relation between the dielectric anisotropy and the frequency can be used to control the orientation of the molecule of the liquid crystal.

When an electric field E(V) generated from a voltage V is applied to the molecule of the liquid crystal, the molecule of the liquid crystal will be rearranged according to the direction of the electric field. The arrangement of the molecule can be expressed by a director function:

$$n = n(x,y,z,E(V))$$

and the electric displacement of the molecule in the electric field can be expressed as $$D = \in \cdot E(V)$$

The effective capacitance C of the liquid crystal capacitor Clc can be further expressed as:

$$C = C(f, E(V)) \text{ or } C = C(f, \in \cdot E(V))$$

Consequently, it is known that the capacitance of the liquid crystal capacitor Clc is highly related to the frequency. When the display refresh frequency f_out changes, the capacitance of the liquid crystal capacitor Clc and its dielectric coefficient $\in$ change as well. In an embodiment, the display refresh frequency f_out of the display panel 122 is greatly decreased during a low frequency mode. The refresh period of the liquid crystal capacitor Clc thus becomes longer and the capacitance of the liquid crystal capacitor Clc becomes higher. In another embodiment, the arrangement and the characteristic of the molecule of the liquid crystal are related to the temperature of the environment where the molecule of the liquid crystal stays. The electronic apparatus system 1 can be operated in environments having two or two kinds of temperatures. Therefore, the capacitance of the liquid crystal capacitor Clc is varied according to the temperature or pressure of the environment where the display panel 120 stays.

Figure 8:
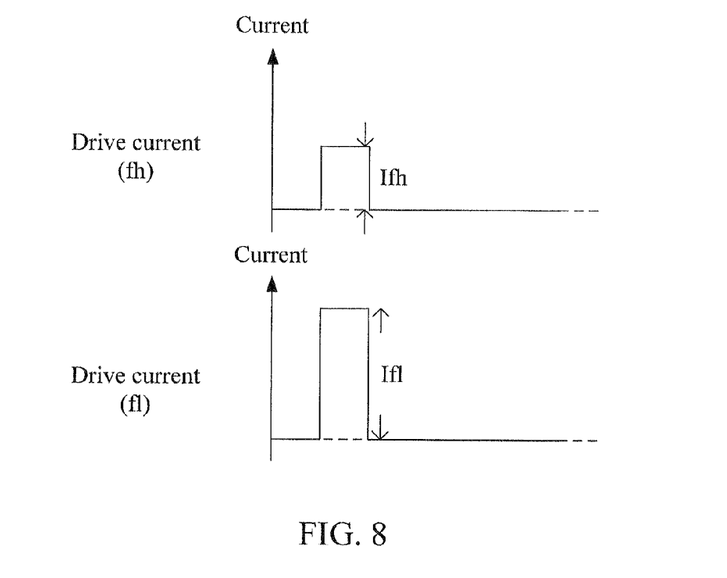
FIG. 8 is a graph of drive currents under different drive modes and display modes.

In order to maintain the voltage level of the liquid crystal capacitor Clc under different frequency modes, different temperatures and different pressures, the capacitance of the storage capacitor units Cst can be adjusted by using the method described above. The drive current Id can be increased to charge the storage capacitor units Cst with a larger current value as well to maintain the voltage level of the liquid crystal capacitor Clc. As shown in FIG. 8, the drive current Ifl generated under the low frequency mode (fl) or generated when a low display refresh frequency is directly outputted can be adjusted to a current value higher than the drive current Ifh generated under the high frequency mode (fh). The drive current is adjusted according to the variation of the display refresh frequency and the capacitance of the storage capacitor units Cst in the embodiments described above. However, in other embodiments, the drive current Id can be adjusted according different drive modes related to different temperatures or different display modes.

Figure 9:
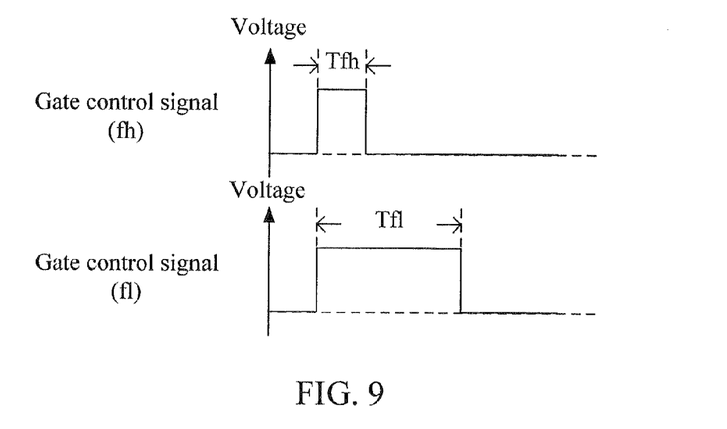
FIG. 9 is a graph of lengths of charging time determined by the gate control signal under different drive modes and display modes.

Similarly, the drive circuit 120 can control the length of the charging time by using the gate control signal Vg according to different display modes, different display refresh frequencies, different capacitances of the storage capacitor unit Cst and different drive methods. In an embodiment, the display refresh frequency f2 of the display panel 122 is greatly decreased under the low frequency mode provided by the frequency adjusting unit 102 or when a low display refresh frequency is directly outputted. Hence, the refresh period of the liquid crystal capacitor Clc becomes longer. In order to maintain the voltage level of the liquid crystal capacitor Clc, the capacitance of the storage capacitor unit Cst can be adjusted by using the method described above. Besides, the length of the charging time can be adjusted by changing the turn-on time of the gate control signal Vg to charge the storage capacitor unit Cst with a longer charging time in the same period to maintain the voltage level of the liquid crystal capacitor Clc. As shown in FIG. 9, the length of the charging time Tfl under the low frequency mode (fl) can be adjusted to be longer than the charging time Tfh under the high frequency mode (fh).

It noted that, the drive current and the length of the charging time can be adjusted at the same time to accomplish the best display result.

Figure 10:
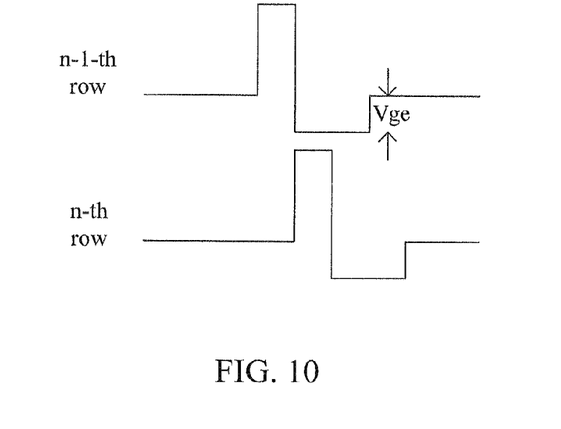
FIG. 10 is a graph of the waveform of the gate control signal when a three-stage driving method is used.
Figure 11:
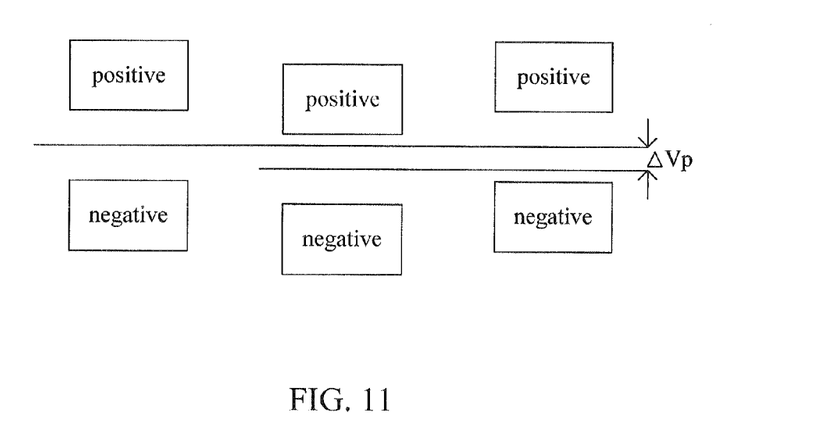
FIG. 11 is a graph depicting the amount of voltage that needs to be compensated when the three-stage driving method is used.

In an embodiment, the drive circuit 120 can use different drive circuit compensation methods and parameters to charge the storage capacitor unit Cst according to different display modes, different display refresh frequencies, different capacitances of the storage capacitor unit Cst and different drive methods. FIG. 10 is a graph of the waveform of the gate control signal when a three-stage driving method is used. FIG. 11 is a graph depicting the amount of voltage ΔVp that needs to be compensated when the three-stage driving method is used. The capacitances of the liquid crystal capacitor Clc and the storage capacitor unit Cst change when different display refresh frequencies are presented. Further, the feed through voltage generated due to the coupling effect of the capacitors will change as well. Therefore, the voltage ΔVp that needs to be compensated changes as well. For example, when the frequency adjusting unit 102 is in the low frequency mode or when a low display refresh frequency is directly outputted, the capacitances of the liquid crystal capacitor Clc and the storage capacitor unit Cst become larger such that the voltage Δ Vp that needs to be compensated becomes larger as well.

In an embodiment, the drive compensation method and parameters can be adjusted by generating a pull-down compensation voltage Vge as shown in FIG. 10. The pull-down compensation voltage Vge is performed on the gate control signal Vg applied on the n−1-th row of the pixels to compensate the voltage of the n-th row of the pixels. The waveform of the drive voltage (i.e. the width, the voltage difference, the height, the slope of tangent line or a timing of the driving voltage) can be adjusted as well. In other embodiments, the drive compensation method and parameters of the display panel are adjusted according to a plurality of built-in gamma curves and a plurality of gamma parameters. In some embodiments, the drive compensation method and parameters of the display panel are adjusted according by changing an initial voltage of the liquid crystal, a turning voltage of the liquid crystal or a threshold voltage of the transistors.

The drive circuit 120 in the embodiment shown in FIG. 3A uses a-Si TFT (thin film transistor) or oxide TFT having a two-gate structure 142 to decrease the leakage current of the drive circuit 120, in which the low leakage current is beneficial to the maintenance of the voltage of the display signal. The two-gate structure 142 can be a two-gate TFT or two-gate TFT with a lightly doped drain. In an embodiment, an off-state leakage current of the drive circuit is smaller than or equal to $10^{-13}$ A. In another embodiment, the off-state leakage current of the drive circuit is smaller than or equal to $10^{-14}$ A.

Figure 3B:
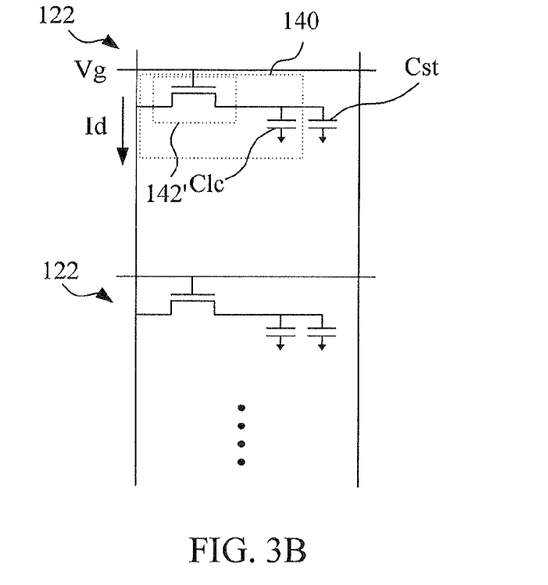
FIG. 3B is a top view of pixel units of the display device in another embodiment of the present disclosure.

In another embodiment, the drive circuit comprises single-gate or a two-gate TFT structure 142' such as a-Si TFT or oxide TFT corresponding to one of the pixel units as shown in FIG. 3B. The oxide TFT is manufacturing by using a-IGZO (amorphous Indium Gallium Zinc Oxide) instead of Si adapted in a-Si TFT. The advantages of oxide TFT are that a reduced number of masks are used during the manufacturing process and the cost of the oxide TFT is lower than the low temperature poly-silicon (LTPS) TFT. Further, the oxide TFT has excellent uniformity and surface flatness and can be used in the manufacturing of the substrate in the fifth-generation fabrication line. In an embodiment, the organic TFT can be applied as well. The high field-effect mobility and the large on-current of the organic TFT can speed up the charging process since its on-current is larger than common TFTs. Besides, the organic TFT can make the off-state leakage current of the drive circuit smaller than or equal to $10^{-12}$ A. In another embodiment, the off-state leakage current of the drive circuit can be smaller than or equal to $10^{-13}$ A.

There are many types of liquid crystal displays such as a-Si TFT, LTPS TFT, u-Si TFT and oxide TFT, in which a-Si TFT is the most popular technology. Comparing to LTPS TFT, the manufacturing process of a-Si TFT is shorter, the cost of a-Si TFT is lower and the production capacity of a-Si TFT is larger. Though the reliability of LTPS TFT is higher than a-Si TFT, the leakage current of LTPS TFT is larger than a-Si TFT. Hence, LTPS TFT cannot save power. There are many manufacturers start to develop new technology to lower the mura effect generated due to the uneven crystallization of Si and raise the electron mobility of the TFT at the same time to further speed up the manufacturing process and lower the cost.

Both u-Si TFT and oxide TFT have higher electron mobility and lower leakage current than a-Si TFT. The dLTA (diode laser thermal annealing) is used in the manufacturing process of u-Si TFT and oxide TFT, in which a scanning process using infrared laser having a wavelength of 800 nm and a speed of 150 nm/s is applied to accomplish the crystallization of Si. The TFT manufactured according to the method described above has an electron mobility of 0-10 $cm^2/Vs$. The experimental result shows that the electron mobility is about 3.1 $cm^2/Vs$.

Hence, the structures of two-gate TFT and two TFTs have better performance than the structure of single-gate TFT. Further, the substrates formed by u-Si TFT and oxide TFT have better performance than the substrate formed by a-Si TFT.

In an embodiment, row inversion drive method or frame inversion drive method can be applied to the drive circuit 120.

The present disclosure discloses an electronic apparatus device having a liquid crystal display device that is able to adjust the display refresh frequency dynamically and the pixel units using a drive circuit having two TFT, single-gate TFT or two-gate TFT such as a-Si TFT or oxide TFT. The capacitance of the storage capacitor, the drive current, the length of the charging time, the drive compensation methods and parameters of the electronic apparatus device can also be dynamically adjusted. Further, the display refresh frequency of the display device can be adjusted according to the image characteristic categorization (e.g. motion image, still image, picture, text, fast motion image or slow motion image) of the image information to accomplish the power-saving mechanism. At least two or more than two groups of frequencies are adapted in the frequency adjusting unit.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An electronic apparatus system comprising:
   a register to store image information having a data input refresh frequency;
   a display device comprising a display panel having a plurality of pixel units and a plurality of storage capacitor units; and a control circuit to control a display mode and a drive mode of the display panel and to further adjust a drive method and a control circuit compensation structure of the display panel dynamically;

wherein the storage capacitor units comprises a plurality of storage capacitor blocks and the effective capacitive value of the storage capacitor units is adjusted by controlling an electrically connecting form of the storage capacitor units according to a display mode control signal, and a drive current is adjusted or changed according to a variation of the effective capacitive value of the storage capacitor units, wherein when the effective capacitive value is increased, the drive current is increased and when the effective capacitive value is decreased, the drive current is decreased;

wherein the drive method comprises adjusting a length of the charging time of the display panel dynamically and the length of the charging time is adjusted dynamically by adjusting a turn-on time of a gate-control signal.

2. The electronic apparatus system of claim 1, wherein the drive method comprises adjusting a drive current of the display panel dynamically, the control circuit further adjusts a display refresh frequency of the display panel dynamically and the drive current is adjusted or changed according to a variation of the display refresh frequency, wherein when the display refresh frequency is increased, drive current is decreased and when the display refresh frequency is decreased, the drive current is increased.

3. The electronic apparatus system of claim 1, wherein the electronic apparatus system is operated in environments having two or two kinds of temperatures.

4. The electronic apparatus system of claim 1, further comprising a drive circuit having at least two TFT switches, a two-gate TFT or a lightly-doped drain TFT corresponding to each of a plurality of pixels of the display panel and an off-state leakage current of the drive circuit is smaller than or equal to $10^{-12}$ A.

5. An electronic apparatus system at least comprising:
a register to store image information having a data input refresh frequency;
a display device comprising a display panel having a plurality of pixel units and a plurality of storage capacitor units; and
a control circuit to control a display mode and a drive mode of the display panel and to further adjust a drive method and a control circuit compensation structure of the display panel dynamically;

wherein the storage capacitor units comprises a plurality of storage capacitor blocks and the effective capacitive value of the storage capacitor units is adjusted by controlling an electrically connecting form of the storage capacitor units according to a display mode control signal, and a drive current is adjusted or changed according to a variation of the effective capacitive value of the storage capacitor units, wherein when the effective capacitive value is increased, the drive current is increased and when the effective capacitive value is decreased, the drive current is decreased;

wherein the drive method comprises adjusting a drive current of the display panel dynamically, the control circuit further adjusts a display refresh frequency of the display panel dynamically and the drive current is adjusted or changed according to a variation of the display refresh frequency, wherein when the display refresh frequency is increased, drive current is decreased and when the display refresh frequency is decreased, the drive current is increased.

6. The electronic apparatus system of claim 5, wherein the electronic apparatus system is operated in environments having two or two kinds of temperatures.

7. The electronic apparatus system of claim 5, further comprising a drive circuit having at least two TFT switches, a two-gate TFT or a lightly-doped drain TFT corresponding to each of a plurality of pixels of the display panel and an off-state leakage current of the drive circuit is smaller than or equal to $10^{-12}$ A.

* * * * *